United States Patent [19]

Fisher et al.

[11] Patent Number: 4,633,968
[45] Date of Patent: Jan. 6, 1987

[54] BRAKE ACTUATING SYSTEM

[75] Inventors: Brian Fisher; Raymond R. Westmoreland, both of Cropwell Bishop, United Kingdom

[73] Assignee: Fisher Westmoreland (UK) Limited, Nottingham, United Kingdom

[21] Appl. No.: 676,172

[22] Filed: Nov. 29, 1984

[30] Foreign Application Priority Data

| Dec. 2, 1983 | [GB] | United Kingdom | 8332259 |
| Jan. 9, 1984 | [GB] | United Kingdom | 8400433 |
| Mar. 15, 1984 | [GB] | United Kingdom | 8406762 |
| Mar. 15, 1984 | [GB] | United Kingdom | 8406763 |

[51] Int. Cl.⁴ .............................................. B60T 7/12
[52] U.S. Cl. ........................................ 180/275; 303/9
[58] Field of Search ...................... 180/275, 274; 303/9

[56] References Cited

U.S. PATENT DOCUMENTS 3,986,577 10/1976 Ebbesson et al. ................ 180/275
4,105,237 8/1978 Viall, Sr. et al. ................ 180/275
4,146,107 3/1979 Ebbesson et al. ................ 180/275

Primary Examiner—John J. Love
Assistant Examiner—Kenneth R. Rice
Attorney, Agent, or Firm—Paul & Paul

[57] ABSTRACT

An auxiliary braking device for a vehicle operable when the vehicle is in a reversing condition is disclosed.

9 Claims, 14 Drawing Figures

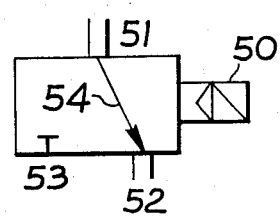
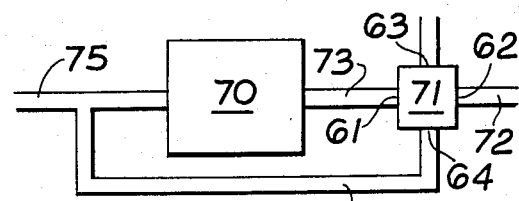
Fig. 5  Fig. 6
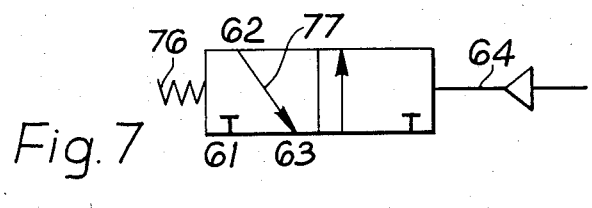
Fig. 7
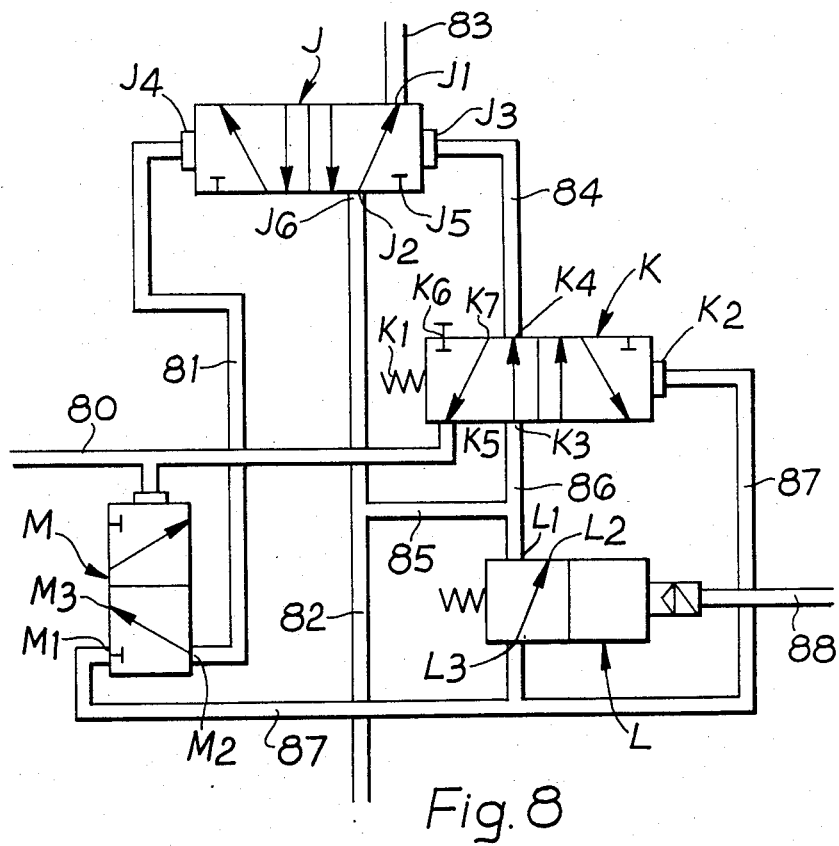
Fig. 8

BRAKE ACTUATING SYSTEM

This invention relates to vehicle braking systems and more particularly concerns fluid actuated braking systems.

Conventional fluid actuated braking systems for vehicles include a source of fluid under pressure, such as a compressor, driven by the vehicle prime mover and connected to a source of pressure so as to build up pressure in the fluid tank. The fluid tank is connected by a main service line to a brake mechanism, the service line including valve means actuated by the vehicle driver, such as a foot brake pedal. The main service line also includes means which, on release of the brake pedal, causes the line to be exhausted to atmosphere.

Most commercial vehicles are provided with a second service line which may be referred to as an emergency line. This line is normally supplied with pressurised fluid from a secondary pressurised fluid tank. The pressurised fluid is utilised to hold the brakes off, i.e., in the inoperative condition, so that if there is a failure in the system, such as a failure to provide the necessary pressurised fluid, then the brakes will be applied automatically without any action by the driver.

Sometimes such a second service line can also provide a hand brake facility. One popular system is known as the "spring brake" system where the brakes are normally held off against spring pressure by fluid pressure and when the fluid pressure in released the springs apply the brakes. In such systems release of the pressure by a hand brake lever can be used to apply the brakes.

In some countries a three line system is employed and may even be obligatory. The third service line is sometimes referred to as a "deadman line" and may be operated if the main service and emergency lines fail for any reason. Where a third line is provided it may act as a hand brake line.

In our prior U.K. specification No. 2,027,828 there is described and claimed a braking system which is actuatable by a detector at the rear of the vehicle so as to cause the vehicle to be braked when an object is struck whilst the vehicle is reversing. The detector at the rear of the vehicle is reversing. The detector at the rear of the vehicle may be a pivoted bar, such as described in our U.K. specification No. 2,027,828 or may be a source of pressurised fluid such as air.

The previous system described in our U.K. specification No. 2,027,828 is extremely effective in that it causes a vehicle to be braked when an object is struck only when the vehicle is travelling in the reverse direction. In the embodiment described in the specification this is achieved by incorporating an auxiliary braking system including a valve which is actuated only when the vehicle is in a reversing condition i.e. when a driver selects reverse and a valve which is activated by the detector at the rear of the vehicle. The auxiliary braking system responds to actuation of the valves to operate a valve in the braking system of the vehicle and cause the brakes to be applied. The system described can operate in any of the lines described above by the use of an appropriate valve.

Another important factor in the design of a reverse brake for a vehicle is that the brakes should remain applied to hold the vehicle stationary after an object has been struck. This is particularly important where a movable object such as a person is struck during the reversing operation since if the person falls away from the detecting means at the rear of the vehicle and the brakes are automatically released then this could give rise to an extremely dangerous situation. The auxiliary braking means can therefore include what is referred to as a "lock-on" feature which prevents the vehicle being moved after an object has been struck to operate the detecting means.

In our prior U.K. patent specification No. 2,027,828 a particular type of "lock-on" feature is described in which the vehicle cannot be moved until the detecting means at the rear of the vehicle has been physically operated and the gear selector has been moved to a position other than reverse. In certain circumstances such an arrangement can be disadvantageous; for example a driver could leave this vehicle to go to the rear of the vehicle to operate the detecting means and the vehicle is on a hill it could then roll backwards if the driver had failed to apply his hand brake. In normal circumstances, of course, a driver would apply his hand brake and if necessary an alarm signal could be arranged to remind him to apply the hand brake.

An object of the present invention is to provide an improved auxiliary braking device for the vehicle.

According to the present invention there is provided an auxiliary braking device for a vehicle operable when the vehicle is in a reversing condition said device comprising:

detecting means adapted to be mounted at the rear of a vehicle and comprising a deformable means arranged to generate a signal on contact with an obstruction;

first responsive means operable by a signal generated by placing the vehicle in a reversing condition;

second responsive means operable by said detecting means signal;

fluid control valve means adapted to be incorporated in the vehicle braking system and to actuate the vehicle brakes;

said first and second responsive means being arranged to control said valve means to cause actuation of the vehicle brakes; and selective means for ensuring that said second responsive means is operable by said detecting means signal only when the first responsive means has been operated.

It is one of the features of the present invention that it provides a different type of "lock-on" feature in that the lock-on of the brakes applies only whilst the vehicle remains in reverse condition and as soon as the selector is moved out of reverse it is then possible to move the vehicle again.

We have also found that the use of deformable means to generate a signal on contact with an obstruction is advantageous. Whilst electrical signal generating means can be employed it is preferred to use a fluid chamber such as an air chamber, which can generate a signal in the form of a pressure pulse when distorted.

Such a pulse can be used to operate a valve directly by pilot operation or to operate a pressure switch in an electrical circuit.

Where an air chamber is employed we have found that changes in air pressure can cause a pulse sufficiently strong to actuate the auxiliary device. Since sensitivity is important the device must be made selective to ensure that such changes in pressure do not generate a continuous pressure pulse which will actuate the braking system as soon as reverse condition is selected by the driver, thereby rendering the vehicle incapable of being driven in reverse.

Reference is now made to the accompanying drawings in which:

FIG. 5 is a diagrammatic cross-section of a valve suitable for use as a second control valve in the circuits shown in FIGS. 1 and 2;

FIG. 6 is a diagrammatic illustration showing the incorporation of selective valve means;

FIG. 7 is a diagrammatic detail view of the valve of the selective means of FIG. 6;

FIG. 8 is a diagrammatic circuit diagram of another embodiment of the invention incorporating selective valve means;

Figure 1:
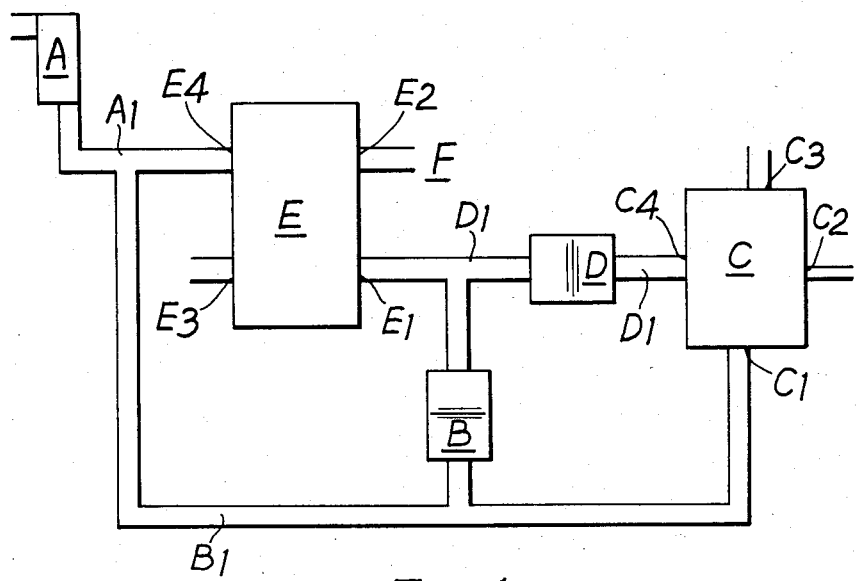
FIG. 1 is a schematic circuit diagram of one form of auxiliary braking system according to the invention in the main service line of a vehicle.

In the embodiment shown in FIG. 1 the auxiliary braking system is shown in the main service line (foot brake line) of a vehicle. The system comprises a valve E which is a spool or shuttle valve having a pilot inlet E1, an inlet E2 connected in the main service line, an outlet E3 which is connected to the emergency relay valve of the vehicle and Port E4 which is connected to a line A1 from a first responsive valve A which in turn is connected to a source of pressurised fluid. The first responsive valve A may be a conventional solenoid valve operated by an electrical switch associated with the vehicle reverse selector.

The line B1 from the outlet side of the valve A is connected to an inlet C1 of a second control valve C. Also connected to the valve C at C2 is a line from a source of pressurised fluid associated with the detecting means at the rear of the vehicle, an exhaust to atmosphere at C3, and a line D1 at C4.

The line D1 is taken via a non-return valve D to the pilot inlet E1 of the valve E. The line B1 is also connected via a one-way valve B to the line D1 before the inlet E1.

When reverse is selected by the vehicle driver valve A is operated and pressurises Port E4 of valve E and simultaneously the non-return valve B and the actuating valve C through the line B1. When the inlet C2 of the valve C is pressurised by actuation of the detecting means then valve C is operated and the inlet E1 of the valve E is pressurised by way of the line D1 non-return valve D.

The valve E in its normal position provides a fluid path between inlet E2 and outlet E3 thereby connecting the main service line of the vehicle to the emergency relay valve. When the valve E is operated by pressurising the pilot inlet E1 the spool or shuttle closes inlet E2 and connects E4 to E3 thereby pressurising the emergency relay valve to actuate the brakes of the vehicle.

When the pressure applied to the inlet C2 of valve C is removed, actuating valve C and the non-return valve D are exhausted via the exhaust outlet C3 but the non-return valve D maintains pressure at the pilot inlet E1 thus keeping the brakes actuated. When the reverse selector is taken out of reverse fluid is exhausted to atmosphere via the valve A which releases the pressure at the inlet port E1 through the one-way valve B and the line B1. The valve E then returns to its normal position with the line connected to the emergency relay valve and the brakes can then operate in a normal manner.

Figure 2:
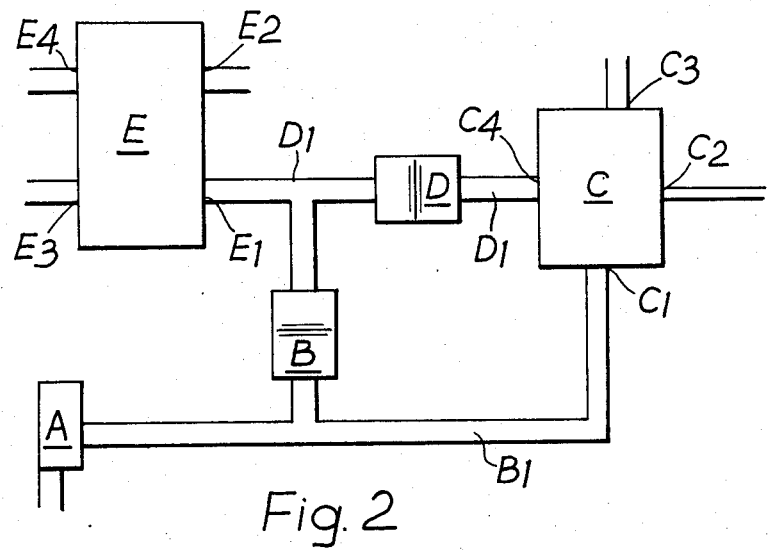
FIG. 2 is a schematic circuit diagram of an auxiliary braking system according to the invention in an emergency service line of a vehicle.

Referring to FIG. 2 an alternative embodiment of the invention is described in which the auxiliary circuit fluid control valve is incorporated in an emergency line of a vehicle. In this embodiment the valves B, C and D are similar to those in FIG. 1 but the connections to valve E are different. Inlet E2 is connected to the emergency line of the vehicle, outlet E4 is connected to atmosphere, the connections to E1 and E3 being as in FIG. 1. The valve A is connected to valve C by a line B1 but not to valve E.

This system operates as follows. When valve A is operated pressure is applied to inlet C1. Operation of valve C by pressure at C2 applies pressure to pilot inlet E1 to operate valve E. This causes the inlet E1 to be closed and the outlets E3 and E4 to be connected thereby exhausting the emergency relay valve to atmosphere and causing actuation of the vehicle brakes.

As in the case of the system shown in FIG. 1 the pressure at E1 is maintained until valve A is released causing the pressure to be released by way of the one-way valve B.

Figure 3:
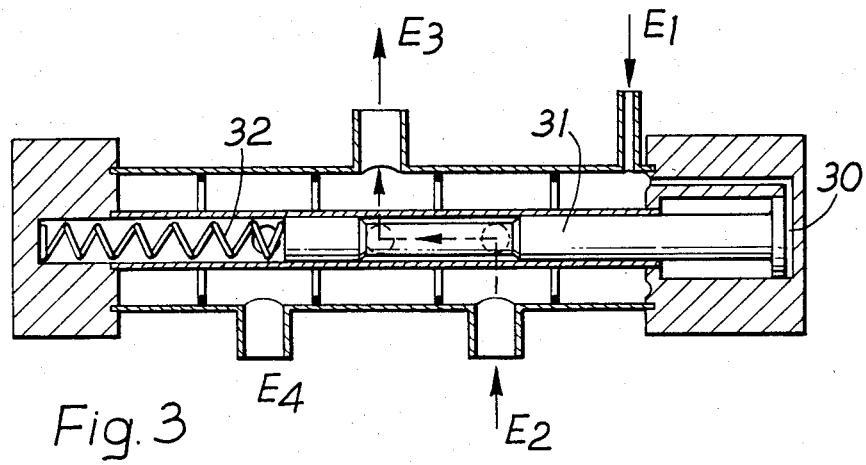
FIG. 3 is a diagrammatic view of a spool or shuttle valve suitable for use as a fluid control valve in the circuits shown in FIGS. 1 and 2.

A valve suitable for use as valve E is shown in FIG. 3 in its normal position. The valve is operated by pressure at E1 which is applied to the rear of piston 10 to urge valve member 11 against the spring pressure of spring 12 into an operated position in which E4 is connected to E3 and E2 is closed.

Figure 4:
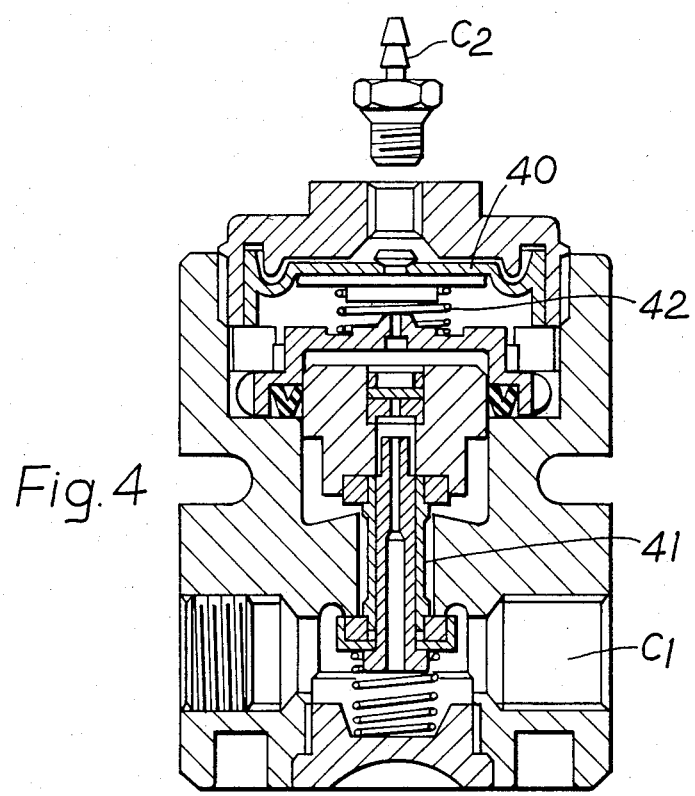
FIG. 4 is a diagrammatic cross-section of a valve suitable for use as a first control valve in the circuits shown in FIGS. 1 and 2.

A valve suitable for use as valve C is shown in FIG. 4. Inlet C2 leads to a diaphragm 20 which urges valve member 21 against spring 22 to connect C1 to C4. Outlets C3 and C4 are not shown. A suitable commercially available valve can be arranged to be operated by a differential pressure of between one half inch and three inches of water.

Referring to FIG. 5 the solenoid valve A comprises an electrically operated solenoid 50, an inlet 51, outlet 52 and outlet 53. When the valve is operated (e.g. by a current from the reversing light switch) the valve member 54 is in the position shown and connects inlet 51 to outlet 52. Inlet 51 is connected to a source of pressurised air and outlet 52 is connected to a valve to be operated, e.g. by the line A1 in FIG. 1.

The provision of selective valve means for the circuits of FIGS. 1 and 2 is shown in FIG. 6. A fluid actuated auxiliary reverse braking system 70 is connected to a line 75 associated with the vehicle reverse selection system and a line 73 connected to a detector (not shown) by way of a pressure relief valve 71 and a conduit 72. When line 75 is pressurised due to the vehicle being in a reverse condition and line 72 is pressurised by the detector the auxiliary reverse braking system 70 is actuated.

The pressure relief valve 71 normally connects line 72 to atmosphere but operation of the vehicle reverse selector causes increase in pressure of the line 75 and the line 74 thereby operating the valve 71 to connect line 72 to line 73 and to close the connection to atmosphere, thereby connecting the detector to the auxiliary braking system.

Referring to FIG. 7, it can be seen that the valve member 77 is biassed by spring 76 to connect inlet 62 to outlet 63. When pressure is applied to the inlet 64 the valve member 77 moves from the position shown in FIG. 7 to connect inlet 62 to outlet 61 so that detector 5 is connected to the auxiliary braking system 70. In this position actuation of the detector by striking an obstruction will cause a pressure pulse to be applied to the auxiliary braking system 70 to operate the brakes by way of lines 72 to 73 and valve 71.

A circuit which incorporates selective means in the form of an exhaust to atmosphere for the air chamber of the detector is shown in FIG. 8.

In this embodiment of the invention the first responsive means comprises a solenoid valve L, the second responsive means comprises a pilot operated valve M, the selective means comprises a pilot operated valve K and the fluid control valve means comprises a shuttle or spool valve J. The device is shown in its normal position with no signal generated by either the vehicle being in a reversing condition or by the detector contacting an obstacle.

The shuttle valve J is pilot operated with pilot return and is connected in the emergency line of the vehicle which is normally pressurised, the air pressure serving to hold-off the brakes either by way of an emergency relay valve or by spring brakes. The input from the emergency line is 82 and the outlet to the emergency line is 83. This is directly connected by way of J1 and J6. The pressure in line 82 pressurises line 85 which by way of K3 and K4 of valve K pressurises pilot return port J3 of valve J to hold it positively in that position.

The leads 88 to the solenoid valve L are connected to the vehicle reversing light circuit to receive a signal when the vehicle is in a reversing condition. Other means of generating this signal could of course be employed. In this position L1 is connected to L2 which is blanked-off and L3 does not pressurise line 87.

The line 80 is connected to an air chamber of a detector, to the pilot inlet of valve M and to port K5 of valve K which communicates with port K7 which is open to atmosphere. Thus any changes in pressure in the air chamber or line 80 do not affect valve M.

When solenoid valve L is operated L1 is connected to L3 which pressurises line 87 thereby pressurising port K2 to operate valve K. This blanks off the connection of K5 to atmosphere and connects K3 to atmosphere by way of K6 thereby removing pressure from J3 so that valve J is now operable by pressure at J4.

When the device is in this condition a signal from the detector in line 80 will cause operation of valve M. This connects ports M1 and M2 causing line 87 to pressurise line 81 and hence port J4 to operate valve J. When valve J is operated port J6 is blanked-off leaving line 82 pressurised but J1 is connected to J5 and exhausted to atmosphere. This will therefore cause the emergency braking system of the vehicle to be operated.

The device will remain in this condition and the brakes will be applied even when the signal is removed from line 80 providing an effective "lock-on" feature. The vehicle can only be moved by disengaging the reverse condition, whereby removing the signal from leads 88 causing valve L to close the connection between L1 and L3 and exhaust line 87 to atmosphere through L3 and L2. Line 81 is exhausted by way of M2 and M1 releasing pressure from J4 and spring K1 returns valve K to its original condition, thus pressurising J3 to return valve J to its original condition. This will occur even if the signal pulse is still maintained in line 80. Removal of the signal pulse from line 80 will return valve M to its original condition connecting J4 to atmosphere by way of line 81 and ports M2 and M3.

An arrangement similar to that shown in FIG. 8 can be employed in the main foot brake line of the vehicle if desired. This may give faster action than utilising the springs of a spring brake emergency system.

In this case the line 82 is connected to line 83 through valve J but pressure is applied to inlet J5 and line 85 from the emergency line (not shown). The operation of the device is as described above except that operation of valve J causes the line 83 to be pressurised through J5 and J1 and the foot brake line at J6 is blanked-off. The arrangement is fail-safe as the vehicle can be moved only when valve J is returned to normal condition connecting J1 with J6.

If desired, a manual operating device may be arranged to be connected to the auxiliary fluid circuit as described above so as to be capable of actuating said braking arrangement when the vehicle is in a reversing condition. The manual operating device can be a device capable of delivering a pulse of pressurised air to the system.

Preferably, the manual operating device is normally biassed into a condition in which it fcauses actuation of the brakes and is operated manually into a condition in which it is does not cause actuation of the brakes.

This type of operating device has a high safety factor since if a person is guiding a vehicle which is reversing he must manually operate the device to enable the vehicle to move in a reverse direction. If he falls or moves into a dangerous position he released the operating device thereby causing actuation of the brakes to prevent the vehicle moving.

The operating device may be a mechanical device or an electrical switch connected, for example, to the electrical supply of the vehicle.

Figure 9:
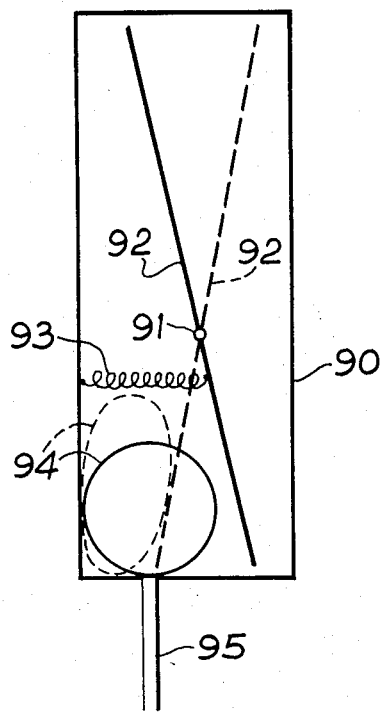
FIG. 9 is a diagrammatic illustration of an alternative means for operating the valve system.

A preferred air bag arrangement is shown in FIG. 9 and is arranged to be held in the hand to be retained in an inoperative condition and to provide an increase in air pressure when released thereby providing a fail-safe operation for a person when controlling the reversing of a vehicle.

In FIG. 9 the device comprises a frame 90 which supports a pivot 91 for a lever 92. The lever is biassed by a spring 93 into a position in which a rubber air bag 94 is compressed to provide an increase in pressure in the air-line 95. This position is shown in broken lines.

The air bag arrangement can be held inoperative by applying manual pressure in the direction of arrow 'P' so that the lever is in the position shown in FIG. 9.

The device can be connected to the auxiliary fluid circuit by the addition of a T-piece in the line to the second control valve.

The detector for use in the present invention can generate a signal in the form of a pressure pulse or an electrical pulse. It can, for example comprise a fluid chamber, such as an air chamber, which on contact with an obstruction causes a pressure pulse which can be used directly or used to operate a pressure sensitive switch. Alternatively an electrical signal can be generated directly using a pressure sensitive electrical device such as a pressure sensitive strip. Generally a fluid chamber is preferred as it is less likely to be rendered useless by accidental damage, such as a permanent deformation of the detector or the part of the vehicle on which it is supported.

In its simplest form a detector comprises a rubber tube mounted at the rear of a vehicle but since the tube is liable to damage it is required to be of robust construction.

We have also found that the sensitivity to external pressure can be varied by providing different cross sections and in particular we have found that an increased sensitivity is achieved by using a fluid chamber of relatively small cross section in combination with an energy absorber.

The energy absorber may comprise a section of resilient material or a fluid chamber defined by a resilient and/or elastic material or it may comprise material which is inherently resilient and/or elastic such as a foam. In a further alternative the energy absorber may comprise a cantilever which is either inherently resilient or which is resiliently biassed towards a normal position.

Figure 10:
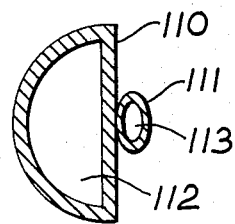
FIGS. 10 to 14 show alternative cross-sectional views of detectors incorporating fluid chambers.

FIG. 10 shows a section 110 defining an energy absorbing fluid chamber 112 with a brake actuating fluid chamber 113 defined by the walls 111.

Figure 11:
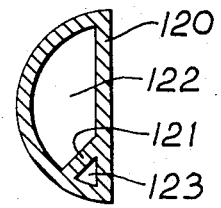

FIG. 11 shows a section 120 having an energy absorbing fluid chamber 122 and a brake actuating fluid chamber 123 defined by a web 121.

Figure 12:
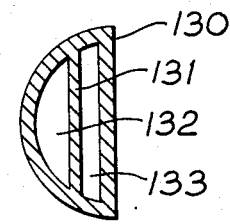

FIG. 12 is similar to FIG. 11 except that the chamber 132 is separated from the chamber 133 by a web 131 which extends parallel to the rear face of the section 130.

Figure 13:
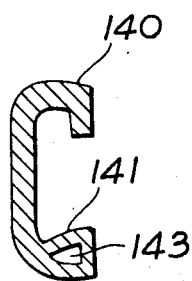

FIG. 13 is an alternative embodiment in which the section does not include an energy absorbing fluid chamber but rather is in the form of a resilient cantilever. The section 140 includes a portion 141 which defines a fluid chamber 143 for effecting brake actuation.

Figure 14:
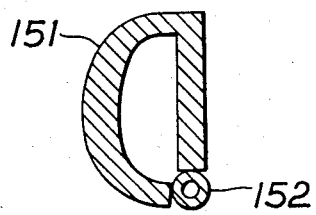

FIG. 14 is a further alternative of cantilever construction utilising a robust cantilever portion 151 with a separate tube 152 of relatively flexible material. The tube 152 is protected from accidental damage by the cantilever portion 151.

We claim:

1. An auxilary braking device for a vehicle operable when the vehicle is in a reversing condition said device comprising:
   detecting means adapted to be mounted at the rear of a vehicle and comprising a deformable means arranged to generate a signal on contact with an obstruction;
   first response means operable by a signal generated by placing the vehicle in a reversing condition;
   second response means operable by said detecting means signal;
   fluid control valve means adapted to be incorporated in the vehicle braking system and to actuate the vehicle brakes;
   said first and second responsive means being arranged to control said valve means to cause actuation of the vehicle brakes; and
   selective means for ensuring that said second response means is operable by said detecting means signal only when the first response means has been operated,
   wherein said selective means is a valve which normally connects a fluid chamber to atmosphere and is operable to close the connection to atmosphere in response to operation of the second responsive means.

2. A device according to claim 1 in which the first responsive means is a solenoid operated valve.

3. A device according to claim 1 in which the second responsive means is a pneumatic pilot operated valve.

4. A device according to claim 1 in which the brake control valve means is a pneumatic pilot operated valve having inoperative and operated conditions.

5. A device according to claim 4 in which the valve is pilot operated with pilot return and is arranged so that when the device is incorporated in the vehicle braking system the valve is held positively in its inoperative condition by air pressure during normal operation of the vehicle but upon operation of the first and second responsive means that air pressure is released and air pressure is applied to urge the valve into its operated condition.

6. A device according to claim 1 in which the valve of the selective means is a pneumatic pilot operated valve.

7. A device for a vehicle operable when the vehicle is in a reversing condition said device comprising:
   detecting means adapted to be mounted at the rear of a vehicle and comprising a deformable means arranged to generate a signal on contact with an obstruction;
   first response means operable by a signal generated by placing the vehicle in a reversing condition;
   second response means operable by said detecting means signal;
   fluid control valve means adapted to be incorporated in the vehicle braking system and to actuate the vehicle brakes;
   said first and second response means being arranged to control said valve means to cause actuation of the vehicle brakes; and
   selective means for ensuring that said second responsive means is operable by said detecting means signal only when the first responsive means has been operated,
   wherein said selective means is a valve which normally connects a fluid chamber to atmosphere and is operable to close the connection to atmosphere in response to operation of the second responsive means.

8. A device according to claim 7 in which the signal-generating portion comprises a fluid chamber adapted to generate a signal in the form of a pressure pulse.

9. A device according to claim 7 or 8 in which the energy absorbing portion comprises a cantilever which on contact with an obstruction is urged towards the signal-generating portion.

* * * * *